US005972460A

United States Patent [19]

Tachiwana

[11] Patent Number: 5,972,460

[45] Date of Patent: Oct. 26, 1999

[54] INFORMATION RECORDING MEDIUM

[75] Inventor: Kazuo Tachiwana, Tokyo, Japan

[73] Assignee: Hoya Corporation, Tokyo, Japan

[21] Appl. No.: 08/999,611

[22] Filed: Dec. 23, 1997

[30] Foreign Application Priority Data

Dec. 26, 1996 [JP] Japan .................................... 8-348896
Dec. 11, 1997 [JP] Japan .................................... 9-341101

[51] Int. Cl.$^6$ ........................................................ G11B 5/66

[52] U.S. Cl. ......................... 428/64.2; 428/145; 428/410; 428/426; 428/432; 428/684 ST; 428/684 SG; 428/900; 427/128; 427/129; 427/130; 427/131

[58] Field of Search .................................... 428/410, 426, 428/694 ST, 694 SG, 900, 64.2, 145, 432; 427/128, 1, 131

[56] References Cited

U.S. PATENT DOCUMENTS 4,156,755 5/1979 Rinehart ................................. 428/410

*Primary Examiner*—Leszek Kiliman
*Attorney, Agent, or Firm*—Nixon & Vanderhye P.C.

[57] ABSTRACT

A highly reliable information recording medium capable of meeting a higher rotation speed of a drive device and a smaller thickness and a higher recording density of an information recording medium can be produced by using, as a substrate, chemically reinforced glass obtained from chemically reinforceable glass having an $SiO_2$—$Al_2O_3$—$R_2O$ total content of more than 98% by weight and having a specific modulus of at least $30\times10^2$.

20 Claims, 1 Drawing Sheet

INFORMATION RECORDING MEDIUM

FIELD OF THE INVENTION

The present invention relates to an information recording medium. More specifically, it relates to a highly reliable information recording medium capable of meeting a higher rotation speed of a drive device and a smaller thickness and a higher recording density of a recording medium.

PRIOR ART

In recent years, with developments of electronics technology, particularly information-related technology typified by computers, demands for information recording media such as an magnetic disk, an optical disk and a magneto-optic disk are rapidly increasing. As a material for the substrate used for the above information recording media, a plastic material and an inorganic glass are known. A substrate formed of a plastic material is distorted or shows surface bending with environmental changes such as changes in temperature and humidity, and the defect thereof is that it is poor in dimensional stability. An inorganic glass, chemically reinforced glass in particular, attracts attention recently, and attempts are being made to apply it to a substrate for an information recording medium.

When the above chemically reinforced glass is produced, glass to be treated is immersed in a molten salt containing a monovalent ion having a greater ionic radius than an alkali metal contained in the glass, and in this case, an alkali metal ion in the glass and the monovalent ion in the molten salt undergo ion exchange, whereby the glass is chemically reinforced.

As the above glass used as a substrate for an information recording medium, i.e., chemically reinforceable glass, a various kinds of glass have been disclosed. For example, there have been disclosed (1) glass containing 60.0 to 70.0% by weight of $SiO_2$, 0.50 to 14.0% by weight of $Al_2O_3$, 10.0 to 32.0% by weight of $R_2O$ (in which R is an alkali metal), 1.0 to 15.0% by weight of ZnO and 1.1 to 14.0% by weight of $B_2O_3$ (JP-B-4-70262) (2) glass containing 58 to 70% by weight of $SiO_2$, 13 to 22% by weight of $Al_2O_3$, 6 to 10% by weight of $Li_2O$, 5 to 12% by weight of $Na_2O$ and 2 to 5% by weight of $ZrO_2$ (JP-B-8-48537), (3) glass containing 55 to 62% by weight of $SiO_2$, 10 to 18% by weight of $Al_2O_3$, 2 to 10% by weight of $ZrO_2$, 2 to 5% by weight of MgO, 0.1 to 3% by weight of BaO, 12 to 15% by weight of $Na_2O$, 2 to 5% by weight of $K_2O$, 0 to 7% by weight of $P_2O_5$ and 0.5 to 5% by weight of $TiO_2$, the total amount of $Al_2O_3$ and $TiO_2$ being 13 to 20% by weight (JP-B-1-167245), and (4) glass containing 64 to 70% by weight of $SiO_2$, 14 to 20% by weight of $Al_2O_3$, 4 to 6% by weight of $Li_2O$, 7 to 10% by weight of $Na_2O$, 0 to 4% by weight of MgO and 0 to 1.5% by weight of $ZrO_2$ (JP-B-6-76224). However, the above kinds of chemically reinforced glass, as a substrate for an information recording medium, have some defects as discussed below and are not necessarily satisfactory.

A substrate for an information recording medium is required not only to have flatness and chemical durability but also to have high reliability to cope with a higher rotation speed of a drive device for an information recording medium and a smaller thickness and a higher recording density of an information recording medium, that is, there is demanded a substrate which is free of breaking and deformation, even if it has a smaller thickness.

Generally, however, with an increase in a rotation rate, the bending increases during rotation, and this tendency notably increases with an increase in specific gravity when the Young's modulus is the same. The above chemically reinforceable glass (1) contains components having a high specific gravity such as ZnO and BaO as essential components, and according to Examples of Japanese Patent Publication thereof, it is a glass composition containing a relatively large amount of the above components and having a high specific gravity. It is therefore difficult to constitute a reliable substrate of chemically reinforced glass obtained therefrom.

Further, for attaining a higher recording density, the flying height of a head tends to be getting smaller and smaller, and in particular, the flying height of a magnetoresistance effect head (MR head) which is expected to be a future head is extremely small. Therefore, a roughness of a disk surface, when it is poor, may cause undesirable events such as the breaking of a disk substrate and failures in write and readout of data due to a contact of the disk substrate to a head, to say nothing of bending, deformation and resonance during rotation. In view of this point, the above chemically reinforceable glass (2) contains at least 2% by weight of $ZrO_2$ as an essential component, and it is difficult to produce a chemically reinforced glass having a smooth and flat surface.

Further, for obtaining a substrate for an information recording medium, it is conventional practice, when a chemically reinforceable glass is chemically reinforced, to carry out ion exchange at a lower temperature than a strain point for increasing strength without causing glass deformation, or to carry out ion exchange at a further lower temperature than a strain point for preventing decomposition of a molten salt in an ion exchange bath used for chemical reinforcement. Since, however, the above chemically reinforceable glass (3) requires at least 480° C. as a temperature for ion exchange as shown in Examples of its Japanese Patent Publication, the deformation of disk-shaped substrate or the decomposition of a molten salt is unavoidable.

In contrast, the above chemically reinforceable glass (4) is subjected to ion exchange at 370° C. According to Examples of its Japanese Patent Publication, however, it is required to immerse it in a molten salt for as long as 22 hours for obtaining an ion-exchanged layer having a thickness of about 300 $\mu$m, and its ion exchange efficiency is very poor. When ion exchange treatment is carried out at a relatively low temperature, generally, the conventional treatment takes a long period of time, and it has not been possible to carry out any efficient chemical reinforcement treatment.

SUMMARY OF THE INVENTION

It is an object of the present invention to provide a highly reliable information recording medium capable of meeting a higher rotation speed of a drive device and a smaller thickness and a higher recording density, from a chemically reinforceable glass which permits efficient ion exchange and can easily give chemically reinforced glass having a deep strain layer and high breaking strength.

According to the present invention, the above object of the present invention is achieved by an information recording medium (to be referred to as "information recording medium I" hereinafter) having at least a recording layer on a substrate, the substrate being formed of chemically reinforced glass obtained by chemically reinforcing chemically reinforceable glass containing $SiO_2$, $Al_2O_3$ and $R_2O$ (in which R is an alkali metal), having an $SiO_2$—$Al_2O_3$—$R_2O$ total content of more than 98% by weight and having a specific modulus of at least $30\times10^2$.

According to the present invention, the above object of the present invention is also achieved by an information recording medium (to be referred to as "information recording medium II" hereinafter) having at least a recording layer on a substrate, the substrate being formed of chemically reinforced glass obtained by chemically reinforcing chemically reinforceable glass substantially containing 61.0 to 75.0% by weight of $SiO_2$, 10.0 to 22.0% by weight of $Al_2O_3$, 4.0 to 8.0% by weight of $Li_2O$ and 10.1 to 15.0% by weight of $Na_2O$.

DETAILED DESCRIPTION OF THE INVENTION

Figure 1:
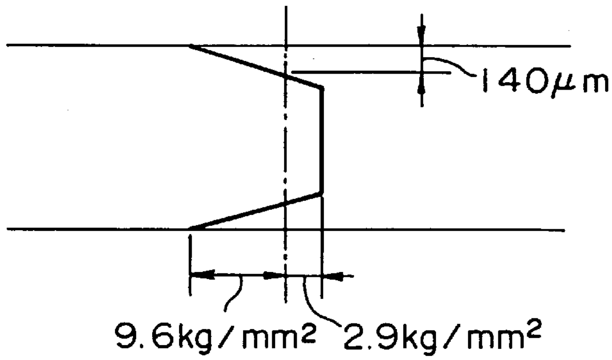
FIG. 1 shows a stress distribution of one example of chemically reinforced glass obtained from chemically reinforceable glass in Example 6.

The present inventors have made diligent studies for achieving the above object, and have found that the above object is achieved by using chemically reinforceable glass having a specific composition and properties.

Each of the information recording media I and II has at least a recording layer on a substrate.

First, the substrate will be explained hereinafter.

The substrate for the information recording medium I is formed of chemically reinforced glass (to be referred to as "chemically reinforced glass I" hereinafter) which is obtained by chemically reinforcing chemically reinforceable glass (to be referred to as "chemically reinforceable glass I" hereinafter) containing $SiO_2$, $Al_2O_3$ and $R_2O$ (in which R is an alkali metal), having an $SiO_2$—$Al_2O_3$—$R_2O$ total content of more than 98% by weight and having a specific modulus of at least $30\times10^2$.

The substrate for the information recording medium II is formed of chemically reinforced glass (to be referred to as "chemically reinforced glass II" hereinafter) which is obtained by chemically reinforcing chemically reinforceable glass (to be referred to as "chemically reinforceable glass II" hereinafter) substantially containing 61.0 to 75.0% by weight of $SiO_2$, 10.0 to 22.0% by weight of $Al_2O_3$, 4.0 to 8.0% by weight of $Li_2O$ and 10.1 to 15.0% by weight of $Na_2O$.

In the information recording medium I, the chemically reinforceable glass I is $SiO_2$—$Al_2O_3$—$R_2O$— containing glass (in which R is an alkali metal), and the total content of $SiO_2$—$Al_2O_3$—$R_2O$ is required to be greater than 98% by weight. In the chemically reinforceable glass I, $SiO_2$ is a main component which forms a glass network, and $Al_2O_3$ is a component which improves chemical durability and promotes ion exchange. $R_2O$ is preferably $Li_2O$ and/or $Na_2O$, and in particular, $Li_2O$ is the most preferred as an alkali ion for use in ion exchange. In the chemically reinforceable glass I, the total content of $SiO_2$, $Al_2O_3$ and $R_2O$ exceeds 98% by weight, and there can be therefore obtained glass having a specific gravity of less than 2.45 and consequently having a high specific modulus. Further, the content of $R_2O$ ($Li_2O$ and/or $Na_2O$) is preferably 15.0 to 20.0% by weight. When the content of $R_2O$ ($Li_2O$ and/or $Na_2O$) exceeds 20% by weight, the chemical durability may be deteriorated, so that the glass may cause a problem in long-term reliability in some cases. On the other hand, when the content of $R_2O$ ($Li_2O$ and/or $Na_2O$) is less than 15% by weight, the ion exchange performance in chemical reinforcement decreases, so that a sufficiently thick compressed stress layer may not be formed in chemical reinforcement treatment at a low temperature for a short period of time.

In the chemically reinforceable glass I, further, the $(Li_2O+Na_2O)/(SiO_2+Al_2O_3)$ weight ratio is preferably in the range of from 0.145 to 0.33. When the above weight ratio is less than 0.145, the glass may have an extremely high viscosity so that it may be difficult to melt the glass. When the above weight ratio exceeds 0.33, the glass tends to have a decreased Young's modulus and an increased crystallinity. In view of a balance among glass viscosity, Young's modulus and crystallinity, the above weight ratio is preferably in the range of from 0.15 to 0.25.

Especially chemically reinforceable glass with excellent chemical durability and alkali-elution free properties can be obtained when $(Li_2O+Na_2O)/(SiO_2+Al_2O_3)$ is at least 0.18 and $Na_2O/(Na_2O+Li_2O)$ is at least 0.67.

Further, the chemically reinforceable glass I is required to have a specific modulus of at least $30\times10^2$. When the specific modulus is less than $30\times10^2$, it is difficult to produce a highly reliable information recording medium. In view of the reliability, etc., of the substrate, the specific modulus is preferably at least $32\times10^2$. The elastic modulus is "Young's modulus/specific gravity", and the specific gravity is a value obtained by measurement according to the method to be described later.

It is sufficient that the above chemically reinforceable glass I should have the above properties, and the content of each component is not specially limited, while the content of each component of the chemically reinforceable glass II to be described below can generally apply.

The chemically reinforceable glass II for the chemically reinforced glass II will be explained below.

The chemically reinforceable glass II is a component substantially containing 61.0 to 75.0% by weight of $SiO_2$, 10.0 to 22.0% by weight of $Al_2O_3$, 4.0 to 8.0% by weight of $Li_2O$ and 10.1 to 15.0% by weight of $Na_2O$. $SiO_2$ is a component which forms a glass network as described already. When its content is less than 61.0% by weight, the devitrification resistance of the glass is low, no stably producible glass can be obtained, and further, the glass has a decreased viscosity so that it is difficult to shape it. When its content exceeds 75% by weight, it is difficult to melt the glass. In view of devitrification resistance, viscosity and shapability, the content of $SiO_2$ is preferably in the range of from 62.0 to 72.0% by weight.

$Al_2O_3$ is a component which improves chemical durability and promotes ion exchange as described already. When its content is less than 10.0% by weight, the above effect is not sufficiently exhibited. When its content exceeds 22.0% by weight, the meltability and devitrification resistance of the glass are low. In view of a balance among chemical durability, ion exchange properties, meltability of the glass and devitrification resistance, the content of $Al_2O_3$ is in the range of from 13.0 to 20.0% by weight.

$Li_2O$ is a component which is the most preferred as an alkali ion for use in ion exchange. When its content is less than 4.0% by weight, it is difficult to produce chemically reinforced glass having a thick strain layer and therefore having a sufficient strength. When its content exceeds 8.0% by weight, the chemical durability and the devitrification resistance of the glass are low. In view of the performance and chemical durability of the chemically reinforced glass and devitrification resistance, the content of $Li_2O$ is in the range of from 4.5 to 6.5% by weight.

Like the above $Li_2O$, $Na_2O$ is a component used for obtaining chemically reinforced glass. When its content is less than 10.1% by weight, it is difficult to produce chemically reinforced glass having a sufficiently thick strain layer. When its content exceeds 15.0% by weight, the chemical durability of the glass is low. In view of the performance and chemical durability of the chemically reinforced glass, the content of $Na_2O$ is preferably in the range of from 10.1 to 12.0% by weight.

Further, $K_2O$ may be used as an alkali component as required, while it does not participate in ion exchange and its content is approximately 0 to 1.0% by weight.

As a suitable chemically reinforceable glass, the chemically reinforceable glass II has an $SiO_2$—$Al_2O_3$—$Li_2O$—$Na_2O$ total content of more than 98% by weight. When the above total content exceeds 98% by weight, glass having a specific gravity of less than 2.45 and a high specific modulus can be obtained. The chemically reinforceable glass II generally has a specific modulus of at least $30\times10^2$, preferably at least $32\times10^2$.

In combination with $SiO_2$, $Al_2O_3$, $Li_2O$ and $Na_2O$ as the above essential components, the above chemically reinforceable glass II may contain 0 to 1.5% by weight of MgO, 0 to 1.5% by weight of CaO, 0 to 1.5% by weight of ZnO, 0 to 1.5% by weight of $ZrO_2$, 0 to 1.5% by weight of $TiO_2$, 0 to 1.0% by weight of $B_2O_3$, 0 to 1.0% by weight of $Sb_2O_3$ and 0 to 1.0% by weight of $As_2O_3$. The above MgO, CaO and ZnO all exhibit an effect of improving the glass in meltability when added in a small amount. However, when the content of any one of these exceeds 1.5% by weight, ion exchange is inhibited, and undesirably, the resultant chemically reinforced glass has a decreased thickness of a strain layer. Further, $B_2O_3$ has an effect of improving the glass in meltability. However, when its content exceeds 1.0% by weight, ion exchange is inhibited, and undesirably, the resultant chemically reinforced glass has a decreased thickness of a strain layer.

On the other hand, $ZrO_2$ has an effect of decreasing the melt viscosity of the glass without impairing chemically reinforced properties. However, when its content exceeds 1.5% by weight, undesirably, the glass has an increased specific gravity, and further, the meltability of the glass decreases so that the glass is poor in surface flatness and smoothness. $TiO_2$ has an effect of improving the glass in meltability when added in a small amount. However, when its content exceeds 1.5% by weight, ion exchange is inhibited, and undesirably, the resultant chemically reinforced glass has a decreased thickness of a strain layer.

Further, both $Sb_2O_3$ and $As_2O_3$ are clarifying agents. When the content of either agent exceeds 1.0% by weight, undesirably, the glass is deteriorated in chemically reinforced properties and has an increased specific gravity. It is particularly preferred that the total content of $Sb_2O_3$ and $As_2O_3$ is in the range of from 0 to 1% by weight.

The specific gravity of each of the chemically reinforceable glass I and the chemically reinforceable glass II is preferably 2.45 or less, particularly preferably 2.43 or less, since glass having a high specific modulus can be obtained in this case. In view of shapability or moldability, further, the liquidus temperature of the chemically reinforceable glass is preferably 980° C. or lower, particularly preferably 930° C. or lower. The method of measuring the liquidus temperature will be described later. The chemically reinforceable glass I or II in a weight (g) twice as large as the specific gravity thereof is powdered to an average particle diameter of 425 to 600 μm, the resultant powder is immersed in 2 kg of potassium nitrate/sodium nitrate mixed salts having a weight ratio of 6/4 at 380° C. for 4 hours to carry out ion exchange, and the treated glass is immersed in a bath containing 100 ml of pure water at 80° C. for 24 hours. In this case, the increment of an alkali metal concentration in the water-containing bath is preferably 7.0 mg/liter or less, particularly preferably 5.3 mg/liter or less. When the increment of an alkali metal concentration exceeds 7.0 g/liter, an alkali metal ion in a glass substrate, when a magnetic disk is produced, may be diffused into a magnetic layer to corrode it.

An alkali-elution-free property is one of properties which a substrate for an information recording medium is required to have. The alkali-elution-free property is assumed to have a correlation to the content of $Al_2O_3$ and the surface compression stress value of chemically reinforced glass. $Al_2O_3$ is a component which improves the exchangeability of alkali ions and prevents the elution of alkali ions when chemical reinforcement is carried out.

The surface compression stress refers to a stress caused by the substitution of an alkali metal ion contained in a glass surface layer by an alkali metal ion having a larger ionic radius in the step of chemical reinforcement, and it works to inhibit the movement of an alkali metal ions contained in a glass surface layer. When the above stress is large, therefore, the elution of the alkali metal ions out of glass is inhibited.

In the chemically reinforced glass I and the chemically reinforced glass II, the content of $Al_2O_3$ is relatively large, and the surface compression stress is relatively large due to interaction of components. Therefore, the alkali elution property thereof is remarkably low, and there is remarkably almost no risk of an alkali metal being diffused into a magnetic layer when a substrate for an information recording medium is constituted.

As the chemically reinforceable glass I and the chemically reinforceable glass II, preferred are those which give a strain layer having a thickness of 80 μm or greater within 8 hours when chemically reinforced by ion exchange treatment in a bath containing an Na ion and/or a K ion, in view of excellent chemical reinforceability. Particularly preferred are those which give a strain layer having a thickness of 80 μm or greater within 4 hours. The method of measuring the strain layer for a thickness will be described later.

The chemically reinforced glass I or II is obtained by chemically reinforcing the above chemically reinforceable glass I or II. The chemical reinforcement treatment is not specially limited, and it can be carried out by a conventional method, e.g., by a method in which ion exchange is carried by treating the chemically reinforceable glass I or II in a treatment bath containing an Na ion and/or a K ion. The above treatment is essentially carried out at a temperature lower than the strain point of the glass and at a temperature at which the molten salt is not decomposed. As a treatment bath containing an Na ion and/or a K ion, it is preferred to use a treatment bath sodium nitrate and/or potassium nitrate, while the salt is not limited to nitrates. The salt may be selected from sulfate, bisulfates, carbonates, bicarbonates and halides. When the treatment bath contains an Na ion, the Na ion undergoes ion exchange with a Li ion in the glass. When the treatment bath contains a K ion, the K ion undergoes ion exchange with a Li ion and an Na ion in the glass. Further, when the treatment bath contains an Na ion and a K ion, the Na ion and the K ion undergo ion exchange with a Li ion and an Na ion in the glass. In the above ion exchange, an alkali metal ion in a glass surface portion is replaced with an alkali metal ion having a larger ionic radius, and as the result, a strain layer is formed in the glass surface portion, a compression stress is formed on the glass surface, and a tensile stress is formed within the glass, whereby the glass is chemically reinforced. As described above, the chemically reinforceable glass I and the chemically reinforceable glass II have excellent ion exchangeability, and therefore, the strain layer formed by the ion exchange is deep and has a high breaking strength. As a result, the chemically reinforced glass I and the chemically reinforced glass II have excellent breaking resistance.

In the chemically reinforced glass I or II obtained by chemically reinforcing the chemically reinforceable glass I or II, advantageously, the strain layer has a thickness of at least 100 $\mu$m, a tensile stress of 7.0 kg/m$^2$ or less, a compression stress of at least 5.0 kg/mm$^2$, and a breaking strength of at least 45 kg/mm$^2$, preferably at least 49 kg/mm$^2$ for obtaining a substrate for an information recording medium having reliability and excellent performances.

That is, when the compression stress and the tensile stress are within the above ranges and when the strain layer has a thickness of at least 100 $\mu$m, an ideal stress distribution is formed in the cross section of the chemically reinforced glass, and there is formed chemically reinforced glass almost free from self-breaking.

The chemically reinforced glass and a substrate for an information recording medium, formed of the chemically reinforced glass, have a breaking strength of at least 45 kg/mm$^2$, and can have a breaking strength of at least 49 kg/mm$^2$ in some cases. The methods of measuring the tensile stress, the compression stress and the breaking strength will be explained later.

The information recording medium of the present invention has a substrate formed of the above chemically reinforced glass. The method of producing the substrate is not specially limited, and it can be produced by a conventional method. For example, a disk-like substrate can be directly shaped or molded by a direct pressing method, or the chemically reinforced glass is shaped or molded in the form of a plate by a down draw shaping method, a fusion method or a floating method, then shaped in the form of a disk, and further, ground and polished to obtain a substrate having a desired size and form.

The grinding and polishing step is largely classified into (1) the step of rough grinding, (2) the step of sanding (precision grinding, lapping), (3) the step of polishing (first polishing) and (4) the step of second polishing (final polishing). Owing to the synergistic effects produced by these precision grinding and polishing steps and the material of the chemically reinforced glass, there can be obtained a substrate having a surface roughness (Ra) of 10 angstroms or less, and there can be further obtained a substrate having a surface roughness (Ra) of 7 angstroms or less.

The substrate may be textured, as required, by surface treatment with mixed liquids of hydrofluoric acid and nitric acid, formation of a concavo-convex layer of aluminum or the like on the substrate surface, or formation of a concavo-convex shape on the substrate surface by irradiation of a light such as laser light or ultraviolet light.

When the substrate is used for an information recording medium standardized to have a diameter of 2.5 inches or less, the substrate preferably has a flatness degree, which is a maximum change value based on full flat, of 3.0 $\mu$m or less when it has a thickness h of 1.0 mm or less, and more preferably has a flatness degree of 2.0 $\mu$p or less when it has a thickness h of 0.7 mm or less.

The information recording medium of the present invention includes a magnetic disk, a magneto-optic disk, an optical disk, and the like, while it is particularly preferably used as a magnetic disk. The magnetic disk is not specially limited, while it preferably includes, e.g., a magnetic disk for use with a low floating head and a magnetic disk for use with a magnetoresistance effect (MR) head or a great-size magnetoresistance effect (GMR) head.

The magnetic disk as one embodiment of the information recording medium of the present invention is obtained by forming at least a magnetic layer as a recording layer on the above substrate. Generally, it can be manufactured by consecutively laminating an undercoating layer, a magnetic layer (recording layer), a protective layer and a lubricating layer on the substrate formed of the chemically reinforced glass having a predetermined flatness and a predetermined surface roughness.

The undercoating layer in the magnetic disk is properly selected depending upon the magnetic layer to be formed thereon. For example, when the magnetic layer composed of Co as a main component is formed, the undercoating layer is preferably formed of Cr alone or a Cr alloy in view of improvements in magnetic characteristics, etc.

The undercoating layer is, for example, a layer formed of at least one material selected from non-magnetic metals such as Cr, Mo, Ta, Ti, W, V, B and Al. The undercoating layer is not always a single layer, and it may be structured to have a plurality of layers formed by laminating layers which are the same or different in kind. For example, the undercoating layer can be a multi-layered undercoating layer of Cr/Cr, Cr/CrMo, Cr/CrV, CrV/CrV, Al/Cr/CrMo, Al/Cr/Cr, Al/Cr/CrV or Al/CrV/CrV.

A concavo-convex control layer may be formed between the glass substrate and the magnetic layer or on the magnetic layer for preventing the sticking between a magnetic head and the magnetic recording medium. The surface roughness of the magnetic recording medium is properly adjusted by forming the above concavo-convex control layer, so that a magnetic head and the magnetic recording medium are no longer sticked to each other and that the magnetic recording medium is highly reliable.

Various materials for the above concavo-convex control layer and various methods for forming the concavo-convex control layer are known, and the material and the method for forming it are not specially limited. As a material for forming the concavo-convex control layer, it is preferred to use a non-magnetic metal material having a melting point higher than the above substrate glass. The material for the above concavo-convex control layer is at least one metal selected from Al, Ag, Ti, Nb, Ta, Bi, Si, Zr, Cr, Cu, Au, Sn, Pd, Sb, Ge or Mg, or it is selected from alloys of these or oxides, nitrides or carbides of these.

The material for the concavo-convex control layer is preferably aluminum alone, an aluminum alloy or a metal compound containing aluminum as a main component such as aluminum oxide or aluminum nitride, in view of easy formation.

In view of the prevention of head sticking, the surface roughness of the concavo-convex control layer is preferably $R_{max}$=50 to 300 angstroms, more preferably in the range of $R_{max}$=100 to 200 angstroms.

When $R_{max}$ is less than 50 angstroms, the magnetic recording medium surface is close to flatness so that, undesirably, a magnetic head and the magnetic recording medium are sticked to each other to damage the magnetic head or the magnetic recording medium or cause a head crush. When $R_{am}$ exceeds 300 angstroms, undesirably, the glide height is extremely large to cause a decrease in recording density.

The material for the magnetic layer in the magnetic disk is not specially limited, and it can be selected from conventionally known materials as required. The magnetic layer include, for example, a layer composed of Co as a main component, such as a layer composed of CoPt, CoCr, CoNi, CoNiCr, CoCrTa, CoPtCr or CoNiPt, or a thin layer composed of CoNiCrPt, CoNiCrTa, CoCrTaPt or CoCrPtSiO. The magnetic layer may have a multi-layered structure (e.g., CoCtPr/CrMo/CoPtCr, CoCrTaPt/CrMo/CoCrTaPt, or the like) formed by dividing magnetic layers with a non-magnetic layer (e.g., Cr, CrMo, CrV or the like).

The magnetic layer for use with a magnetoresistance effect (MR) head or a great-size magnetoresistance effect (GMR) head includes a magnetic layer formed of a Co-containing alloy containing a dopant element selected from Y, Si, a rare earth metal, Hf, Ge, Sn or Zn or an oxide film of the above dopant element.

In addition to the above, the magnetic layer may be a granular layer having a structure in which magnetic particles of Fe, Co, FeCo, CoNiPt, or the like are dispersed in a non-magnetic film formed of ferrite, iron-rare earth metal, $SiO_2$, BN or the like. Further, the magnetic layer may be designed to have an internal or vertical recording system.

The protective layer in the magnetic disk is not specially limited, and it includes a Cr layer, a Cr alloy layer, a carbon layer, a zirconia layer or a silica layer. The protective layer, together with the undercoating layer and the magnetic layer, can be continuously formed with an in-line type sputtering apparatus. The protective layer may have a single layer structure or a multi-layer structure formed of layers which are the same or different in kind.

Other protective layer may be formed on, or in place of, the above protective layer. For example, in place of the above protective layer, a silicon oxide ($SiO_2$) film may be formed by diluting tetraalkoxysilane with an alcohol solvent to prepare a solution, dispersing colloidal silica fine particles in the solution prepared, applying the resultant dispersion to a Cr layer and further calcining the resultant coating to form the silicon oxide layer.

Further, the lubricant layer in the magnetic disk is not specially limited. For example, the lubricant layer is formed by diluting perfluoropolyether (PEPE), which is a liquid lubricant, with a fluorine-containing solvent, applying the resultant solution to the medium surface by a dipping method, a spin coating method or a spraying method, and optionally heat-treating the resultant coating.

The magneto-optic disk and the optical disk as other embodiments of the information recording medium of the present invention will be explained hereinafter.

The magneto-optic disk as another embodiment of the information recording medium of the present invention can employ the constitution of a general magneto-optic disk except that the above chemically reinforced glass is used as a substrate. In a preferred layer structure, the magneto-optic disk has, on the above substrate, a protective layer, a magneto-optic layer as a recording layer, a protective layer and a metal reflection layer. As a material for the magneto-optic layer, there is used an amorphous rare earth metal-transition metal alloy.

The optical disk as further another embodiment of the information recording medium of the present invention can employ the constitution of a general optical disk except that the above chemically reinforced glass is used as a substrate. In a preferred layer structure, the optical disk is formed by arranging a pair of substrates each having a protective layer formed on the above substrate such that the protective layers face each other and arranging a recording layer formed of one layer or a plurality of layers between a pair of the substrates with a protective layer each through a spacer and an adhesive. The material for the recording layer is selected from various inorganic and organic materials.

The present invention will be explained in detail with reference to Examples hereinafter, while the present invention shall not be limited by these Examples.

Chemically reinforceable glass and chemically reinforced glass were measured for properties by the following methods.

<Chemically reinforceable glass>

(1) Young's modulus

With a fully annealed 20 mm × 20 mm × 100 mm sample, ultrasonic wave of 5 MHz was measured for a longitudinal wave velocity, and Young's modulus E was calculated on the basis of the following equation.

$$E = \frac{4G^2 - 3G \cdot V_l^2 \cdot \rho}{G - V_l^2 \cdot \rho} \qquad G = V_s^2 \cdot \rho$$

wherein:

G=Rigidity modulus $V_l$=Longitudinal wave velocity $V_s$=Transversal wave velocity ρ=Density (2) Specific modulus Specific modulus was determined on the basis of Young's modulus/specific gravity.

(3) Alkali elution amount

Measured according to the method described in the present invention (method of measuring an increment of an alkali metal concentration in a treatment bath).

(4) Liquidus temperature

Glass (50 cc) was placed in a platinum crucible, and the crucible was covered and held in a muffle furnace at a predetermined temperature for 24 hours. Then, the glass was observed through a microscope having a magnification of 100 to see whether or not a crystal was present on the surface of the glass and inside the glass. Temperatures shown in Tables 1–3 were the lowest temperatures at which no crystal was precipitated.

<Chemically reinforced glass>

(1) Thickness of strain layer

A sample was measured for a depth of a strain layer from the surface by the Babinet compensation method with a precision strain meter manufactured by Toshiba Corporation.

(2) Breaking strength

Samples having a thickness of 1.5 mm and a width of 25 mm (end faces finished with #1000) were measured according to a three point bending test using a span of 50 mm, and Tables 1–3 show an average of data of 10 samples.

(3) Tensile stress

Measured together with the thickness of a stain layer.

(4) Compression stress

Measured together with the thickness of a stain layer.

EXAMPLES –14 AND COMPARATIVE EXAMPLES 1–3

A silica powder, aluminum hydroxide, alumina, lithium carbonate, sodium carbonate, sodium nitrate, magnesium carbonate, calcium carbonate, zinc oxide, zirconium oxide, titanium oxide, boric acid, antimony oxide, arsenious acid, etc., were used to prepare about 2 kg of a mixture having an oxide film composition shown in Tables 1 to 3. The mixture was melted and clarified at 1,450 to 1,550° C. in a platinum crucible and annealed by casting it into a mold made of iron, whereby plate-shaped chemically reinforceable glass was prepared. Tables 1 to 3 show the physical properties thereof.

Then, the plate-shaped chemically reinforceable glass was cleaned with water, and then subjected to the steps of (1) rough grinding, (2) sanding (precision grinding, lapping), (3) first polishing and (4) second polishing (final polishing).

(1) Rough grinding step

The above plate-shaped chemically reinforceable glass was cut in the shape of a disk with a grinder, and the disk-shaped glass was ground with a relatively coarse diamond grinder to form a disk-shaped glass plate having a diameter of 67 mm and a thickness of 1.5 mm.

Then, both surfaces of the above glass plate were ground, one surface after the other, with a diamond grinder having a smaller particle diameter than the above grinder. In this case, a load of about 100 kg was applied. The glass plate was thereby finished to have a surface roughness of about 10 μm in terms of $R_{max}$ (measured according to JIS B 0601) on each surface.

Then, a hole was made in the central portion of the glass plate with a cylindrical grinder, and the glass plate was also ground on its outer circumferential end surface to have a diameter of 66 mm. Then, the glass plate was chamfered on its outer circumferential end surface and on its inner circumferential end surface as predetermined.

(2) Sanding (lapping) step

Then, the glass plate was subjected to a sanding step. The sanding step was intended for improving the dimensional accuracy and the form accuracy. The sanding step was carried out twice with a lapping apparatus using a grinder having a particle size of #400 for the first time and a grinder having a particle size of #1,000 for the second time.

Specifically, first, the glass plate encased in a carrier was lapped on both surfaces to attain a plane accuracy of 0 to 1 μm and a surface roughness ($R_{max}$) of about 6 μm, with alumina grinding particles having a particle size of #400 under a load of about 100 kg by rotating an internal gear and an external gear.

Then, the alumina grinding particles were replaced with alumina grinding particles having a particle size of #1,000, and the lapping was carried out to attain a surface roughness ($R_{max}$) of about 2 μm.

The glass plate which had been subjected to the above sanding step was cleaned by consecutively immersing it in a washing bath with a neutral detergent and a washing bath with water.

(3) First polishing step

Then, a first polishing step was carried out with a polishing apparatus. The first polishing step was intended for removing scratches and distortions remaining in the above sanding step.

Specifically, the first polishing step was carried out using a hard polisher (cerium pad MHC15, supplied by Sppedfam Corporation) as a polisher (polishing powder) under the following polishing conditions.

Polishing liquid: Cerium oxide + water

Load: 300 g/cm$^2$ (L=238 kg)

Polishing time: 15 minutes

Removal amount: 30 μm

Number of revolution of lower face plate: 40 rpm

Number of revolution of upper face plate: 35 rpm

Number of revolution of internal gear: 14 rpm

Number of revolution of outer gear: 29 rpm

The glass plate which had been subjected to the above first polishing step was cleaned by consecutively immersing it in a bath with a neutral detergent, a bath with pure water, a bath with pure water, a bath with IPA (isopropyl alcohol) and a bath with IPA (drying with vapor).

(4) Second polishing step

Then, a second polishing step was carried out with the same polishing apparatus as that used in the first polishing step, using a soft polisher (Polilax, supplied by Sppedfam Corporation) in place of the hard polisher. The polishing conditions were the same as those in the first polishing step except that the load was 100 g/cm$^2$, that the polishing time was 5 minutes and that the removal amount was 5 μm.

The glass plate which had been subjected to the above second polishing step was cleaned by consecutively immersing it in a bath with a neutral detergent, a bath with a neutral detergent, a bath with pure water, a bath with pure water, a bath with IPA (isopropyl alcohol) and a bath with IPA (drying with vapor). In addition, ultrasonic wave was applied to each washing bath.

A disk-shaped glass plate having an outer diameter of 66 mm, a central hole diameter of 20 mm and a thickness of 0.5 mm was obtained through the above grinding and polishing steps.

The above obtained disk-shaped plate was immersed in a treatment bath containing mixed salts of 60% of $KNO_3$ and 40% of $NaNO_3$ at 400° C., for carrying out ion exchange, whereby a chemically reinforced glass plate was obtained. Tables 1 to 3 show physical properties thereof.

TABLE 1

| | Examples | | | | |
|---|---|---|---|---|---|
| | 1 | 2 | 3 | 4 | 5 |
| Composition of chemicallly reinforceable glass* | | | | | |
| $SiO_2$ | 66.3 | 71.5 | 61.6 | 69.0 | 72.1 |
| $Al_2O_3$ | 18.0 | 10.2 | 20.0 | 11.2 | 10.2 |
| $Li_2O$ | 5.0 | 5.0 | 5.9 | 7.0 | 6.0 |
| $Na_2O$ | 10.5 | 13.1 | 12.5 | 11.4 | 10.5 |
| $Li_2O + Na_2O$ | 15.5 | 18.1 | 18.4 | 18.4 | 16.5 |
| $SiO_2 + Al_2O_3 + R_2O$ | 99.8 | 99.8 | 100 | 98.6 | 98.3 |
| $Li_2O/(SiO_2 + Al_2O_3)$ | 0.06 | 0.06 | 0.07 | 0.09 | 0.07 |
| $Na_2O/(Li_2O + Na_2O)$ | 0.68 | 0.72 | 0.68 | 0.62 | 0.64 |
| $(Li_2O + Na_2O)/(SiO_2 + Al_2O_3)$ | (0.18) | (0.22) | (0.23) | (0.23) | (0.20) |
| MgO | — | — | — | 0.7 | — |
| CaO | — | — | — | — | — |
| ZnO | — | — | — | 0.5 | — |
| $ZrO_2$ | — | — | — | — | — |
| $TiO_2$ | — | — | — | — | — |
| $B_2O_3$ | — | — | — | — | 0.7 |
| $Sb_2O_3$ | 0.2 | 0.2 | — | 0.2 | 0.5 |
| Total | 100.0 | 100.0 | 100.0 | 100.0 | 100.0 |
| Physical properties Chemically reinforceable glass | | | | | |
| Specific gravity | 2.42 | 2.41 | 2.43 | 2.44 | 2.39 |
| Young's modulus | 8,100 | 7,810 | 8,340 | 7,900 | 7,660 |

TABLE 1-continued

| | Examples | | | | |
|---|---|---|---|---|---|
| | 1 | 2 | 3 | 4 | 5 |
| ($kg/mm^2$) | | | | | |
| Specific modulus ($\times 10^2$) | 33.5 | 32.4 | 34.3 | 32.4 | 32.1 |
| alkali elution amount (mg/l) | 3.5 | 4.8 | 2.6 | 4.9 | 5.3 |
| Liquidus temperature (°C.) | 920 | 880 | 980 | 970 | 860 |
| Compression stress ($kg/mm^2$) | 9.6 | 7.5 | 11.0 | 8.0 | 8.5 |
| Thickness ($\mu$m) of strain layer | 120 | 105 | 145 | 130 | 110 |

TABLE 1-continued

| | Examples | | | | |
|---|---|---|---|---|---|
| | 1 | 2 | 3 | 4 | 5 |
| Breaking strength ($kg/mm^2$) | 49.8 | 46.7 | 51.3 | 49.2 | 45.8 |
| Treatment time for chemical reinforcement (hr) | 4 | 4 | 4 | 4 | 4 |

(*Weight %)
(Treatment for chemical reinforcement: Temperature 380° C., $KNO_3/NaNO_3$ mixed salts having a weight ratio of 6:4)

TABLE 2

| | Examples | | | | | |
|---|---|---|---|---|---|---|
| | 6 | 7 | 8 | 9 | 10 | 11 |
| Composition of chemically reinforceable glass* | | | | | | |
| $SiO_2$ | 66.0 | 67.0 | 63.5 | 66.0 | 66.0 | 70.0 |
| $Al_2O_3$ | 17.0 | 15.5 | 19.0 | 17.0 | 17.0 | 17.0 |
| $Li_2O$ | 5.2 | 5.2 | 4.5 | 5.2 | 5.2 | 4.0 |
| $Na_2O$ | 10.8 | 10.8 | 12.5 | 10.8 | 10.8 | 9.0 |
| $Li_2O + Na_2O$ | 16.0 | 16.0 | 17.0 | 16.0 | 16.0 | 13.0 |
| $SiO_2 + Al_2O_3 + R_2O$ | 99.0 | 98.5 | 99.5 | 99.0 | 99.0 | 10o |
| $Li_2O/(SiO_2 + Al_2O_3)$ | 0.06 | 0.06 | 0.05 | 0.06 | 0.06 | 0.05 |
| $Na_2O/(Li_2O + Na_2O)$ | 0.68 | 0.68 | 0.74 | 0.68 | 0.68 | 0.69 |
| $(Li_2O + Na_2O)/(SiO_2 + Al_2O_3)$ | (0.19) | (0.19) | (0.21) | (0.19) | (0.19) | (0.15) |
| MgO | — | — | — | — | — | — |
| CaO | 0.5 | — | — | 0.5 | 0.5 | — |
| ZnO | — | — | — | — | — | — |
| $ZrO_2$ | — | 0.5 | — | — | — | — |
| $TiO_2$ | — | 0.5 | — | — | — | — |
| $B_2O_3$ | — | — | — | — | — | — |
| $Sb_2O_3$ | 0.5 | 0.5 | 0.5 | 0.5 | 0.5 | — |
| Total | 100.0 | 100.0 | 100.0 | 100.0 | 100.0 | 100.0 |
| Physical properties A | | | | | | |
| Specific gravity | 2.43 | 2.44 | 2.43 | 2.43 | 2.43 | 2.42 |
| Young's modulus ($kg/mm^2$) | 8,050 | 8,120 | 8,030 | 8,050 | 8,050 | 8,150 |
| Specific modulus ($\times 10^2$) | 33.1 | 33.3 | 33.0 | 33.1 | 33.1 | 33.7 |
| alkali elution amount (mg/l) | 3.4 | 3.9 | 3.7 | 3.7 | 4.0 | 6.5 |
| Liquidus temperature (°C.) | 910 | 915 | 910 | 910 | 910 | 980 |
| B | | | | | | |
| Compression stress ($kg/mm^2$) | 9.6 | 9.8 | 10.5 | 9.8 | 10.1 | — |
| Thickness ($\mu$m) of strain layer | 140 | 140 | 125 | 200 | 280 | 95 |
| Breaking strength ($kg/mm^2$) | 49.0 | 48.8 | 49.5 | 47.5 | 47.5 | 49 |
| Treatment time for chemical reinforcement (hr) | 4 | 4 | 4 | 8 | 16 | 4 |

A: Chemically reinforceable glass,
B: Chemically reinforced glass
(*Weight %)
(Treatment for chemical reinforcement: Temperature 380° C., $KNO_3/NaNO_3$ mixed salts having a weight ratio of 6:4)

TABLE 3

| | Examples | | | Comparative Examples | | |
|---|---|---|---|---|---|---|
| | 12 | 13 | 14 | 1 | 2 | 3 |
| Composition of chemically reinforceable glass* | | | | | | |
| $SiO_2$ | 72.0 | 55.0 | 65.0 | 66.0 | 76.0 | 60.0 |
| $Al_2O_3$ | 19.0 | 25.0 | 18.0 | 15.0 | 5.0 | 9.5 |
| $Li_2O$ | 8.0 | 7.0 | 9.0 | 3.5 | 5.0 | 8.5 |
| $Na_2O$ | 1.0 | 13.0 | 7.0 | 9.0 | 11.0 | 16.0 |
| $Li_2O + Na_2O$ | 9.0 | 20.0 | 16.0 | 12.5 | 16.0 | 24.5 |
| $SiO_2 + Al_2O_3 + R_2O$ | 100 | 100 | 99.0 | 93.5 | 97.0 | 94.0 |
| $Li_2O/(SiO_2 + Al_2O_3)$ | 0.09 | 0.08 | 0.11 | 0.04 | 0.06 | 0.12 |
| $Na_2O/(Li_2O + Na_2O)$ | 0.11 | 0.65 | 0.44 | 0.72 | 0.69 | 0.65 |
| $(Li_2O + Na_2O)/(SiO_2 + Al_2O_3)$ | (0.10) | (0.25) | (0.19) | (0.15) | (0.20) | (0.35) |
| MgO | — | — | — | 2.5 | — | 4.0 |
| CaO | — | — | — | 2.0 | — | 2.0 |
| ZnO | — | — | 1.0 | — | 2.5 | — |
| $ZrO_2$ | — | — | — | 1.5 | — | — |
| $TiO_2$ | — | — | — | — | — | — |
| $B_2O_3$ | — | — | — | — | — | — |
| $Sb_2O_3$ | — | — | — | 0.5 | 0.5 | — |
| Total | 100.0 | 100.0 | 100.0 | 100.0 | 100.0 | 100.0 |
| Physical properties A | | | | | | |
| Specific gravity | 2.37 | 2.54 | 2.44 | 2.52 | 2.42 | 2.55 |
| Young's modulus (kg/mm$^2$) | 8,210 | 8,250 | 8,130 | 8,000 | 7,050 | 6,850 |
| Specific modulus (×10$^2$) | 34.6 | 32.5 | 33.3 | 31.7 | 29.1 | 26.9 |
| alkali elution amount (mg/l) | 7.2 | 7.1 | 8.5 | 4.1 | 15.3 | 29.0 |
| Liquidus temperature (°C.) | 1,040 | 1,200 | 1,180 | 930 | 900 | 1,080 |
| B | | | | | | |
| Compression stress (kg/mm$^2$) | 14.0 | 25.0 | 13.0 | 23.1 | 5.0 | 10.8 |
| Thickness ($\mu$m) of strain layer | 120 | 115 | 145 | 85 | 60 | 85 |
| Breaking strength (kg/mm$^2$) | 48 | 49 | 50 | 46 | 40 | 38 |
| Treatment time for chemical reinforcement (hr) | 4 | 4 | 4 | 4 | 4 | 4 |

A: Chemically reinforceable glass,
B: Chemically reinforced glass
(*weight %)
(Treatment for chemical reinforcement: Temperature 380° C., $KNO_3/NaNO_3$ mixed salts having a weight ratio of 6:4)

As clearly shown in Tables, the chemically reinforceable glass in each Example had a specific gravity of 2.54 or less, a Young's modulus of at least 7,500 kg/mm$^2$ and a specific modulus of at least 30×10$^2$. Further, In view of Tables 1 to 3 and FIGS. 1 to 3 attached to the present specification, the chemically reinforced glass has a strain layer thickness of at least 100 $\mu$m, a breaking strength of at least 45 kg/mm$^2$, a tensile stress of 7.0 kg or less and a compression stress of at least 5.0 kg/mm$^2$. It is therefore seen that the chemically reinforced glass obtained from the chemically reinforceable glass is suitable as a substrate for a highly reliable information recording medium which is insusceptible to scratching or damage and is almost free from deformation and resonance during rotation at a high rate.

In the chemically reinforced glass in each Example, the alkali elution amount was small. In the glass in Comparative Examples in which the $Al_2O_3$ content was small and out of the range specified in the present invention or in which the content of an alkali metal oxide layer was larger than the range specified in the present invention, the alkali elution amount was large. When the alkali elution amount is large, an alkali metal ion in the glass substrate may be diffused into a magnetic layer to corrode it.

Figure 2:
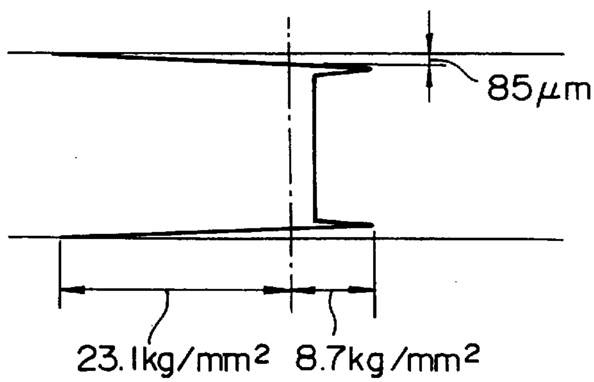
FIG. 2 shows a stress distribution of one example of chemically reinforced glass obtained from chemically reinforceable glass in Comparative Example 1.
Figure 3:
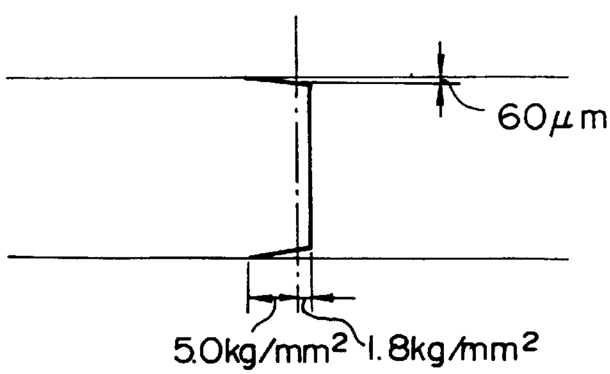
FIG. 3 shows a stress distribution of one example of chemically reinforced glass obtained from chemically reinforceable glass in Comparative Example 2.

Further, a 25 mm × 85 mm × 1.0 mm plate having polished surfaces was prepared from the chemically reinforceable glass in each of Example 6 and Comparative Examples 1 and 2, then, treated for chemical reinforcement and sliced in a cross-sectional direction to prepare measurement samples. The samples were measured for stress distributions with a strain meter. FIG. 1 shows the stress distribution of the glass from Example 6, FIG. 2 shows the stress distribution of the glass from Comparative Example 1, and FIG. 3 shows the stress distribution of the glass from Comparative Example 2.

These Figures show the following. In the chemically reinforceable glass in Example 6, a high stress can be achieved and a deep strain layer can be obtained by chemical reinforcement treatment at a low temperature for a short period of time. Further, since the tensile stress inside the glass is not too large, there is almost no risk of the glass breaking due to a slight scratching on the surface.

On the other hand, in the chemically reinforceable glass in Comparative Example 1, since the content of alkali metal oxide layer component is small, the ion exchange amount is small and the strain layer has a small thickness. Further, since the glass has a large content of an alkaline earth metal layer which inhibits ion exchange, an extremely high tensile stress occurs inside the glass. As a result, as an attempt is made to obtain a higher strength, the risk of the glass self-breaking increases.

Further, in the chemically reinforceable glass in Comparative Example 2, since the content of $Al_2O_3$ is small and is outside the range specified in the present invention, ion exchange is very difficult. In the obtained chemically reinforced glass, therefore, its surface has a low compression stress, and the strain layer has a small thickness.

EXAMPLE 15

A substrate for an information recording medium, having a diameter of 2.5 inches and a thickness of 0.8 mm, was obtained from the chemically reinforced glass obtained in Example 1 by a direct press method, and a texture layer of sputtered AlN, an undercoating layer of CrMo, a magnetic layer of CoPtCrTa and a protective layer of carbon were consecutively formed on both surfaces of the substrate with an in-line sputtering apparatus, to give a magnetic disk.

When the above-obtained magnetic disk was subjected to a glide test, neither a hit (rubbing of a head against projections of a magnetic disk surface) nor a crush (collision of a head against projections of a magnetic disk surface) was found.

The substrate for the information recording medium had a surface roughness (Ra) of 5 angstroms and a flatness of 1 $\mu$m.

EXAMPLE 16

An undercoating layer of Al (thickness, 50 angstroms)/Cr (1,000 angstroms)/CrMo (100 angstroms), a magnetic layer of CoPtCr (120 angstroms)/CrMo (50 angstroms)/CoPtCr (120 angstroms) and a protective layer of Cr (50 angstroms) were formed on both surfaces of the same substrate for an information recording medium as that used in Example 15, with an in-line sputtering method.

The above substrate was immersed in an organosilicon compound solution (mixture of water, isopropanol and tetraethoxysilane) containing $SiO_2$ particles (particle diameter 100 angstroms) dispersed therein, and then calcined to form a protective layer which was formed of $SiO_2$ and had a texture function. Further, the protective layer was dip-treated with a lubricant of perfluoropolyether, to form a lubricant layer, whereby a magnetic disk for an MR head was obtained.

The obtained magnetic disk was subjected to a glide test to show neither a hit nor a crush. It was also found that no defect occurred in the magnetic layer, etc.

EXAMPLE 17

A magnetic disk was prepared in the same manner as in Example 16 except that the undercoating layer was replaced with an undercoating layer of Al/Cr/Cr and that the magnetic layer was replaced with a magnetic layer of CoNiCrTa. The magnetic disk was tested in the same manner as in Example 16 to show results similar to those in Example 16.

According to the present invention, there can be obtained a highly reliable information recording medium which can meet a higher rotation speed of a drive device and a smaller thickness and a higher recording density of an information recording medium, by using, as a substrate material, chemically reinforced glass obtained from chemically reinforceable glass which permits effective ion exchange and easily gives chemically reinforced glass having a deep strain layer and a high breaking strength. The information recording medium is suitable, e.g., for use as a magnetic disk, a magneto-optic disk or an optical disk.

What is claimed is:

1. An information recording medium having at least a recording layer on a substrate, the substrate being formed of chemically reinforced glass obtained by chemically reinforcing chemically reinforceable glass containing $SiO_2$, $Al_2O_3$ and $R_2O$ (in which R is an alkali metal), having an $SiO_2$—$Al_2O_3$—$R_2O$ total content of more than 98% by weight and having a specific modulus of at least $30\times10^2$.

2. The information recording medium of claim 1, wherein $R_2O$ in the chemically reinforceable glass is $Li_2O$ and/or $Na_2O$.

3. The information recording medium of claim 2, wherein the chemically reinforceable glass has a $Li_2O+Na_2O$ total content of 15.0 to 20.0% by weight.

4. The information recording medium of claim 2, wherein the chemically reinforceable glass has an $(Li_2O+Na_2O)/(SiO_2+Al_2O_3)$ weight ratio of 0.145 to 0.33.

5. The information recording medium of claim 1, wherein the chemically reinforceable glass has a liquidus temperature of 980° C. or lower.

6. The information recording medium of claim 1, wherein the chemically reinforceable glass is glass which shows a 7.0 mg/liter or less increment of an alkali metal concentration when the chemically reinforceable glass in a weight (g) twice as large as its specific gravity is powdered to an average particle diameter of 425 to 600 $\mu$m, the resultant powder is immersed in 2 kg of potassium nitrate/sodium nitrate mixed salts having a weight ratio of 6/4 at 380° C. for 4 hours to carry out ion exchange, and the treated glass is immersed in a treatment bath containing 100 ml of pure water at 80° C. for 24 hours.

7. The information recording medium of claim 1, wherein the chemically reinforceable glass gives a strain layer having a thickness of at least 80 $\mu$m within 8 hours when the chemically reinforceable glass is chemically reinforced by ion exchange treatment in a treatment bath containing an Na ion and/or a K ion.

8. The information recording medium of claim 1, wherein the chemically reinforced glass has a strain layer thickness of at least 100 $\mu$m, a tensile stress of 7.0 $kg/mm^2$ or less and a compression stress of at least 5.0 $kg/mm^2$.

9. The information recording medium of claim 1, wherein the chemically reinforced glass has a surface roughness (Ra) of 10 angstroms or less.

10. An information recording medium having at least a recording layer on a substrate, the substrate being formed of chemically reinforced glass obtained by chemically reinforcing chemically enforceable glass substantially containing 61.0 to 75.0% by weight of $SiO_2$, 10.0 to 22.0% by weight of $Al_2O_3$, 4.0 to 8.0% by weight of $Li_2O$ and 10.1 to 15.0% by weight of $Na_2O$ and having an $SiO_2$—$Al_2O_3$—$R_2O$ content, where R is an alkali metal, of more than 98% by weight and a specific modulus of at least $30\times10^2$.

11. The information recording medium of claim 10, wherein the chemically reinforceable glass substantially contains 62.0 to 72.0% by weight of $SiO_2$, 13.0 to 20.0% by weight of $Al_2O_3$, 4.5 to 6.5% by weight of $Li_2O$ and 10.1 to 12.0% by weight of $Na_2O$.

12. The information recording medium of claim 1, which is a magnetic disk.

13. An information recording medium according to claim 10, wherein the chemically reinforceable glass further contains $ZrO_2$ in an amount of 0 to 1.5% by weight.

14. A method of making an information recording medium comprising applying at least a recording layer onto a chemically reinforced glass substrate obtained by chemically reinforcing chemically reinforceable glass containing $SiO_2$, $Al_2O_3$ and $R_2O$, in which R is an alkali metal, having an $SiO_2$—$Al_2O_3$—$R_2O$ total content of more than 98% by weight and having a specific modulus of at least $30\times10^2$.

15. The method according to claim 14, wherein the chemically reinforceable glass has a liquidus temperature of 980° C. or lower.

16. The method according to claim 14, wherein the chemically reinforceable glass is glass which shows a 7.0 mg/liter or less increment of alkali metal concentration when the chemically reinforceable glass in a weight (g) twice as large as its specific gravity is powdered to an average particle diameter of 425 to 600 μm, the resultant powder is immersed in 2 kg of potassium nitrate/sodium nitrate mixed salts having a weight ratio of 6/4 at 380° C. for 4 hours to carry out ion exchange, and the treated glass is immersed in a treatment bath containing 100 ml of pure water at 80° C. for 24 hours.

17. The method according to claim 14, wherein the chemically reinforceable glass provides a strain layer having a thickness of at least 80 μm within 8 hours when the chemically reinforceable glass is chemically reinforced by ion exchange treatment in a treatment bath containing an Na ion and/or a K ion.

18. The method according to claim 14, wherein the chemically reinforced glass has a strain layer thickness of at least 100 μm, a tensile stress of 7.0 $kg/mm^2$ or less and a compression stress of at least 5.0 $kg/mm^2$.

19. The method according to claim 14, wherein the chemically reinforced glass has a surface roughness (Ra) of 10 angstroms or less.

20. A method of making an information recording medium comprising applying at least a recording layer onto a chemically reinforced glass obtained by chemically reinforcing chemically reinforceable glass substantially containing 61.0 to 75.0% by weight of $SiO_2$, 10.0 to 22.0% by weight of $Al_2O_3$, 4.0 to 8.0% by weight of $Li_2O$ and 10.1 to 15.0% by weight of $Na_2O$, having an $SiO_2$—$Al_2O_3$—$R_2O$, in which R is an alkali metal, total content of more than 98% by weight and having a specific modulus of at least $30\times10^2$.

* * * * *